2,031,165

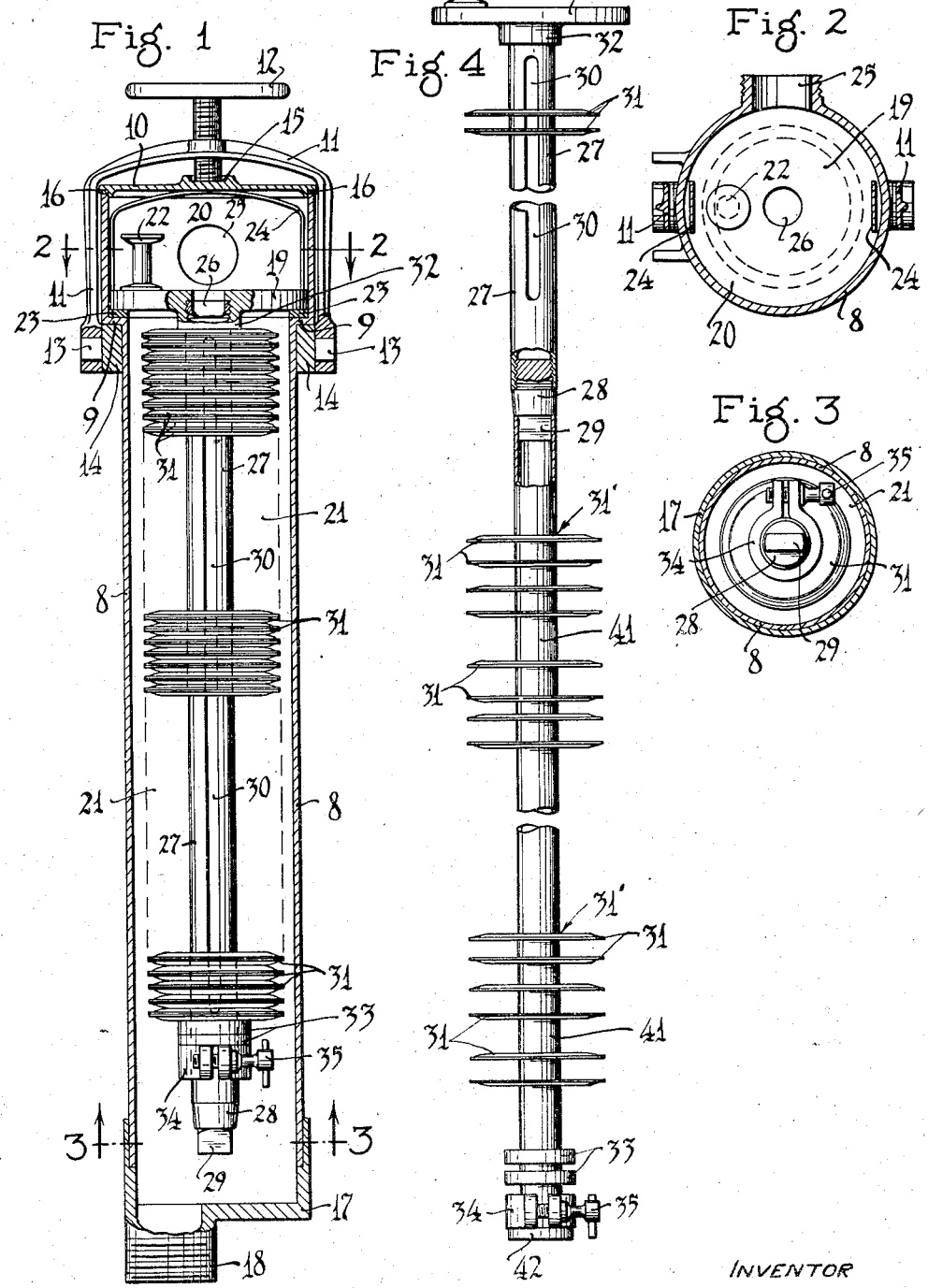
Feb. 18, 1936. C. A. E. JOHNSON 2,031,165
MILK STRAINER
Filed July 21, 1934 2 Sheets-Sheet 1
INVENTOR
Clarence A. E. Johnson
By His Attorneys Feb. 18, 1936. C. A. E. JOHNSON 2,031,165
MILK STRAINER
Filed July 21, 1934 2 Sheets-Sheet 2
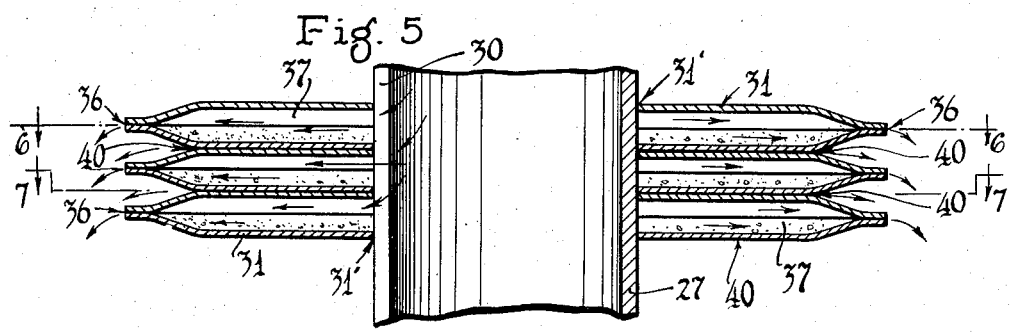
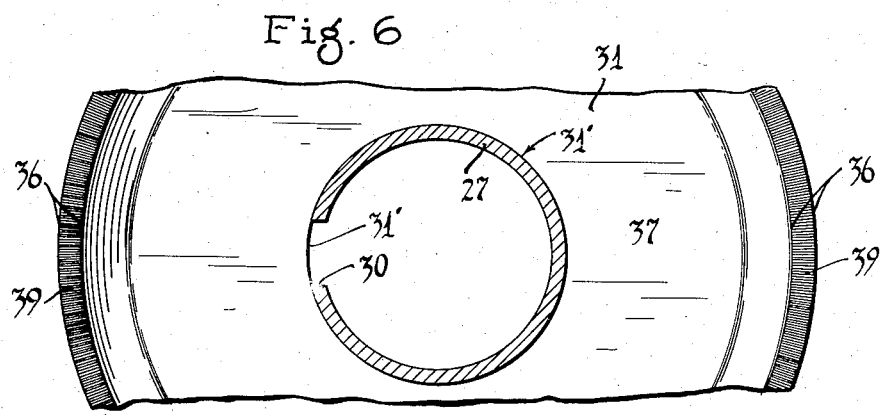
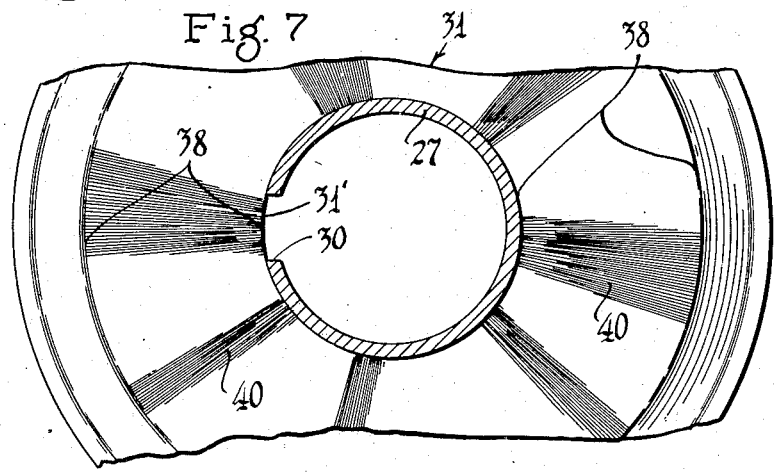
INVENTOR
Clarence A. E. Johnson
BY HIS ATTORNEYS
Merchant Kilson Patented Feb. 18, 1936

UNITED STATES PATENT OFFICE 2,031,165

MILK STRAINER

Clarence A. E. Johnson, Minneapolis, Minn.

Application July 21, 1934, Serial No. 736,436

4 Claims. (Cl. 210—181)

My invention relates to liquid strainers and more particularly milk strainers.

It has been the general practice to strain milk through cloth (cotton bags) but for sanitary reasons certain municipalities have passed ordinances prohibiting the use of such bags as well as wire screens. Furthermore, cloth bags have not been entirely satisfactory, even aside from the sanitary standpoint, for the reason that the milk must be strained when warm. Butter fat in cold milk will quickly clog a cloth bag to such an extent as to materially reduce the conducting capacity thereof. Attempts have been made to use perforated metal plates in the straining of milk but it is impossible to make the holes fine enough to do efficient work.

The object of this invention is to provide a simple and highly efficient strainer that will remove all foreign matter from milk as required by the strictest health movements, that will not clog or absorb liquid being strained, and that can be easily and quickly cleaned after usage and put in a sanitary condition.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view of the invention partly in central longitudinal section and partly in side elevation with some parts removed;

Figs. 2 and 3 are transverse sections taken on the lines 2—2 and 3—3 of Fig. 1, respectively;

Fig. 4 is a fragmentary view partly in side elevation showing the strainer removed from the casing with a tube extension applied thereto and with the strainer discs separated for the purpose of cleansing;

Fig. 5 is a fragmentary detail view in central longitudinal section of the strainer on an enlarged scale;

Fig. 6 is a view partly in plan and partly in section taken on the line 6—6 of Fig. 5; and Fig. 7 is a view partly in plan and partly in section taken on the line 7—7 of Fig. 5.

The numeral 8 indicates an upright cylindrical casing, the upper end portion of which is expanded to increase the diameter thereof and form an annular shoulder 9. This expanded portion of the casing 8 is normally closed, at its upper end, by a cover 10 held in place by a yoke 11 and a co-operating hand-screw 12. Said yoke 11 straddles the cover 10 and casing 8 and is pivoted to short trunnions 13 for swinging movement to one side of the cover 10 to permit removal thereof. The trunnions 13 are formed with a collar 14, encircling the casing 8 below the shoulder 9, and held against lifting movement by said shoulder under the action of the hand-screw 12. Said hand-screw 12 has threaded engagement with the transverse portion of the yoke 11 and its lower end impinges the cover 10 in a cap-like seat 15 formed with said cover. A gasket 16 is interposed between the cover 10 and the upper end of the casing 8 to form an air-tight joint therebetween. The lower end of the casing 8 is closed by a cap 17 having a depending screw-threaded discharge nipple 18.

Removably mounted in the cylinder 8 is a disc-like head 19 supported on the shoulder 9 and forms a partition which divides said casing into a relatively shallow milk intake compartment 20 in the top of the casing 8 and a relatively deep strainer compartment 21 below the head 19.

Secured to the head 19 is an off-center upstanding handle 22 by which said head may be lifted from the compartment 20. A gasket 23 is interposed between the head 19 and the shoulder 9 and which head is yieldingly pressed onto the gasket 23, to form an air-tight joint between the two compartments 20 and 21, by a yoke-like spring 24. The legs of the spring 24 rest on the head 19 at diametrically opposite points and the cover 10 bears on the transverse portion of the spring 24 and holds the same under compression.

Formed with the casing 8, above the head 19, is an outwardly and radially projecting screw-threaded nipple 25 for a pipe, not shown, leading from a pump constructed and arranged to deliver milk into the compartment 20 under pressure. Heretofore, it has been customary to hold a strainer bag suspended in the compartment 21 from the head 19 into which milk was fed from the compartment 20 through a central hole 26 in the head 19.

The parts thus far described are of standard and well-known construction.

Referring now in detail to the invention, the numeral 27 indicates a tube attached to the head 19, at the axis thereof, by screw-threads and held suspended in the compartment 21 at the center thereof. The lower end of the tube 27 is normally closed by a screw-plug 28 having on its lower end a flattened lug 29 by which said plug may be turned.

It is important to note that the ends of the lug 29 terminate short of the sides of the plug 28 for a purpose that will presently appear.

Formed in the tube 27 is a longitudinally extended slot 30 which extends substantially the full length of the tube 27 and through which milk, entering the tube 27 through the hole 26, is forced under pressure.

The strainer proper consists of a multiplicity of pairs of metal plates or discs 31 telescoped onto the tube 27 in the form of a stack. The uppermost disc 31 externally bears against an annular shoulder 32 on the tube 27 at a point above the upper end of the slot 30. The lowermost disc 31 externally rests on a pair of collars 33 on the tube 27 just below the lower end of the slot 30, and which collars are held in place by a transversely divided clamping collar 34 having at its ends a pair of outturned laterally spaced lugs in which is mounted a thumb-screw 35 for use in frictionally clamping the collar 34 on the tube 27. The discs 31 of each pair bear the one upon the other at their outer marginal portions and which portions afford opposing and co-operating strainer surfaces 36. Inwardly of the strainer surfaces 36, the discs 31 of each pair are laterally offset to afford a collecting compartment 37 that is closed, except at the axial holes 31' in the respective discs 31, through which the tube 27 extends. Obviously, the slot 30 is completely closed to the compartment 21 by the discs 31 and which slot affords a communicating passageway from the tube 27 to the collecting compartments 37.

The pressure on the milk in the tube 27 and the compartments 37 is sufficient to force the milk through the joints between the discs 31 of each pair and between opposing discs of adjacent pairs. The strainer surfaces between the discs of adjacent pairs in indicated by the numeral 38.

To increase the efficiency of the opposing and co-operating strainer surfaces 36 and 38, said surfaces are roughened by forming therein hair-like grooves, as indicated by the numerals 39 and 40, respectively. These roughened surfaces 39 and 40 facilitate the movement of the milk over the co-operating separating surfaces. All foreign matter in the milk removed by the separating surfaces 36 will be held in the collecting compartments 37. Milk strained by the separating surfaces 36 and 38 will escape through the joints between the discs 31 of each pair and discs 31 of adjacent pairs and be precipitated into the compartment 21 where the same will escape through the nipple 18 and be conveyed therefrom through a pipe attached to said nipple. Obviously, the straining capacity of the apparatus may be varied by varying the number of pairs of discs 31 on the tube 27 and also by varying the diameter of the discs 31.

To cleanse the apparatus the cover 10 is removed and the head 19 lifted from the compartment 20 with the attached tube 27 and discs 31. With the head 19 and attached parts removed from the casing 8 the collar 34 is moved to the extreme lower end of the tube 27 to permit the discs 31 to separate during the cleansing thereof so that all foreign matter between the several discs 31 and in the compartments 37, as well as the tube 27, may be removed and the several parts of the strainer thoroughly sterilized. The casing 8 and all parts attached thereto may also be easily cleaned while the head 19 and parts attached thereto are removed from the casing 8.

In case there is not sufficient room between the normal position of the collar 34 and the lower end of the tube 27 to permit proper separation of the discs 31 a tube extension 41 may be used to receive all or part of the discs 31 on the tube 27 by an axial sliding movement of said discs thereon.

One end of the tube extension 41 is telescoped onto the lug 29 which, as previously stated, is reduced in length to receive the same, as shown in Fig. 4. On the outer end of the tube extension 41 is a fixed collar 42 which prevents the accidental removal of the collars 33, 34 and the discs 31 from said tube extension.

The laterally offset portions of the discs 31 of each pair permit slight yielding action thereof so that by pressing the collar 34 on the tube 27 toward the shoulder 32, the entire stack of discs 31 may be compressed to increase the pressure between opposing discs 31 of adjacent pairs and between the outer marginal portions of the discs 31 of each pair.

It will thus be seen that the compression of the stack of discs 31 permits milk to be strained through joints between the discs of different widths or, in other words, the fineness of the straining action may be varied, at will.

Actual commercial usage of the invention has proven highly efficient for the purpose had in view.

From what has been said, it will be understood that the strainer described is capable of modifications as to details of construction and arrangement within the scope of the invention herein disclosed and claimed.

What I claim is:

1. In a device of the class described, a multiplicity of pairs of plates having aligned central holes, a tube extending through said holes, means for holding the plates on the tube with the plates of each pair contacting the one with the other at their outer marginal portions to afford co-operating strainer surfaces and with the opposing plates of adjacent pairs contacting the one with the other to afford co-operating strainer surfaces, the plates of each pair inwardly of their strainer surfaces being spaced apart to afford a collecting compartment, said tube and the collecting compartments having communicating passageways, said tube having a fluid intake opening and a tube extension applicable to one end of the tube for receiving at least part of the plates on the tube to separate the same for cleansing purposes when released by said holding means.

2. In a device of the class described, a pair of axially spaced concavo-convex plates the concave sides of which are in opposing relation, said plates having wide rim portions that are parallel and rest directly, the one upon the other, at least one of the opposing faces of said rim portions being roughened to afford a strainer surface.

3. In a device of the class described, a pair of parallel axially spaced concavo-convex plates supported the one pair upon the other, the concave sides of the plates of each pair being in opposing relation, the plates of each pair having wide rim portions that are parallel and rest directly, the one upon the other, the opposing faces of the rim portions of each pair of plates being roughened to afford strainer surfaces, a tube extending axially through aligned apertures in the pair of plates, and means for holding the pairs of plates against axial movement on the tube, said tube having a longitudinal closure, the ends of which terminate short of the two outermost plates.

4. The structure defined in claim 3 in which one of the plate holding means is adjustable to spring the plate of each pair to vary the pressure therebetween at their contacting surfaces.

CLARENCE A. E. JOHNSON.